(12) United States Patent  
Dureau et al.

(10) Patent No.: US 9,165,535 B2  
(45) Date of Patent: Oct. 20, 2015

(54) SYSTEM AND METHOD FOR DETERMINING A ZOOM FACTOR OF CONTENT DISPLAYED ON A DISPLAY DEVICE

(71) Applicant: GOOGLE INC., Mountain View, CA (US)

(72) Inventors: Vincent L. Dureau, San Francisco, CA (US); Jae Seo, Seoul (KR)

(73) Assignee: GOOGLE INC., Mountain View, CA (US)

(*) Notice: Subject to any disclaimer, the term of this patent is extended or adjusted under 35 U.S.C. 154(b) by 64 days.

(21) Appl. No.: 13/723,138

(22) Filed: Dec. 20, 2012

(65) Prior Publication Data

US 2015/0194134 A1     Jul. 9, 2015

Related U.S. Application Data

(60) Provisional application No. 61/706,666, filed on Sep. 27, 2012.

(51) Int. Cl.
```
G09G 5/373      (2006.01)
G09G 5/391      (2006.01)
G01B 11/02      (2006.01)
```

(52) U.S. Cl.  
CPC .............. *G09G 5/373* (2013.01); *G01B 11/026* (2013.01); *G09G 5/391* (2013.01)

(58) Field of Classification Search  
CPC ........... G09G 2340/0407; G09G 5/391; G01B 11/022; G01B 11/026  
USPC .................. 345/419, 660, 667, 156; 382/118; 348/135; 725/12  
See application file for complete search history.

(56) References Cited

U.S. PATENT DOCUMENTS

| | | | |
|---|---|---|---|
| 5,719,951 A * | 2/1998 | Shackleton et al. | 382/118 |
| 2008/0079753 A1* | 4/2008 | Victor et al. | 345/660 |
| 2009/0284594 A1* | 11/2009 | Mitsuhashi | 348/135 |
| 2012/0013604 A1* | 1/2012 | Kang | 345/419 |
| 2012/0044249 A1* | 2/2012 | Mashitani et al. | 345/419 |
| 2012/0287163 A1* | 11/2012 | Djavaherian | 345/667 |
| 2013/0002722 A1* | 1/2013 | Krimon et al. | 345/661 |
| 2013/0063340 A1* | 3/2013 | Mondragon et al. | 345/156 |
| 2013/0177210 A1* | 7/2013 | Jeong et al. | 382/103 |
| 2013/0293456 A1* | 11/2013 | Son et al. | 345/156 |
| 2014/0007148 A1* | 1/2014 | Ratliff et al. | 725/12 |
| 2014/0057675 A1* | 2/2014 | Meyers et al. | 455/556.1 |
| 2014/0152556 A1* | 6/2014 | Ohbitsu | 345/156 |
| 2014/0354695 A1* | 12/2014 | Sakai | 345/650 |

* cited by examiner

*Primary Examiner* — Chante Harrison  
(74) *Attorney, Agent, or Firm* — Morgan, Lewis & Bockius LLP

(57) ABSTRACT

A system, computer-readable storage medium storing at least one program, and a computer-implemented method for determining a zoom factor of content displayed on a display device is presented. An image is obtained from a camera oriented toward a viewing position of the display device, where the image includes a viewer of the display device. The image is normalized based on specification of the camera to produce a normalized image. The normalized image is analyzed to determine a distance between the display device and the viewer of the display device. A zoom factor for content is determined based on the distance between the display device and the viewer of the display device. Content is displayed on the display device using the zoom factor.

25 Claims, 10 Drawing Sheets

702

802 — Identify the face of the viewer in the image

804 — Determine the area of the face of the viewer

902 — Identify the eyes of the viewer in the image

904 — Determine the distance between the eyes of the viewer

1002 — Obtain properties of the content

1004 — Obtain specifications of the display device

1004 — Determine the zoom factor for the content based on the properties of the content, the specifications of the display device, and the distance between the display device and the viewer of the display device

Figure 10

SYSTEM AND METHOD FOR DETERMINING A ZOOM FACTOR OF CONTENT DISPLAYED ON A DISPLAY DEVICE

RELATED APPLICATIONS

This application claims the benefit of U.S. Provisional Patent Application No. 61/706,666, filed on Sep. 27, 2012, and which is incorporated by reference herein in its entirety.

TECHNICAL FIELD

The subject matter disclosed relate generally to determining a zoom factor of content displayed on a display device.

BACKGROUND

The ability of a viewer to see content displayed on a display device with sufficient detail depends on several factors such as the specifications of the display device and/or the distance between the viewer and the display device. When the viewer cannot see the content displayed on the display device with sufficient detail and when the distance between the viewer and the display device can be easily adjusted, the viewer can move either the display device or the viewing position of the viewer so that the distance between the viewer and the display device allows the viewer to see the content displayed in the display device with sufficient detail. However, in some situations, the distance between the viewer and the display device cannot be easily changed. For example, a television set is typically placed in a room where the seating positions cannot be easily changed (e.g., couches). Furthermore, the television set typically cannot be moved easily because the television set is either too heavy or is hardwired to other audio/visual components that cannot be easily moved. Although the viewer may move closer to the television set, the viewer typically has to stand or sit on the floor.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations are used to determine a zoom factor at which to display content on a display device, and subsequently display the content according to the zoom factor. For example, in some implementations, an image is obtained from a camera oriented toward a viewing position of the display device, where the image includes a viewer of the display device. Next, the image is normalized based on a specification of the camera to produce a normalized image. The normalized image is analyzed to determine a distance between the display device and the viewer of the display device. A zoom factor for content is then determined based on the distance between the display device and the viewer of the display device. Content is then displayed on the display device using the zoom factor.

Some implementations include a computer-implemented method for determining a zoom factor of content displayed on a display device, performed on a host device having at least one processor and memory storing at least one program for execution by the at least one processor to perform the method. In some implementations, the computer-implemented method includes: obtaining an image from a camera oriented toward a viewing position of the display device, the image including a viewer of the display device; normalizing the image based on a specification of the camera to produce a normalized image; analyzing the normalized image to determine a distance between the display device and the viewer of the display device; determining a zoom factor for content based on the distance between the display device and the viewer of the display device; and displaying content on the display device using the zoom factor.

In some implementations, normalizing the image based on the specification of the camera includes scaling the image based at least in part on one or more specifications of a lens of the camera and one or more specifications of an image sensor of the camera.

In some implementations, analyzing the normalized image to determine the distance between the display device and the viewer of the display device includes: determining at least one metric for at least one physical feature of the viewer; and using the at least one metric for the at least one physical feature of the viewer to determine the distance between the display device and the viewer of the display device. In some implementations, the at least one metric for the at least one physical feature of the viewer is an area of a face of the viewer, and determining the at least one metric for the at least one physical feature of the viewer includes: identifying the face of the viewer in the image; and determining the area of the face of the viewer. Additionally and/or alternatively, in some implementations, the at least one metric for the at least one physical feature of the viewer is a distance between the eyes of the viewer, and determining the at least one metric for the at least one physical feature of the viewer includes: identifying the eyes of the viewer in the image; and determining the distance between the eyes of the viewer.

In some implementations, determining the zoom factor for the content based on the distance between the display device and the viewer of the display device includes: obtaining one or more properties of the content; obtaining one or more specifications of the display device; and determining the zoom factor for the content based on the one or more properties of the content, the one or more specifications of the display device, and the distance between the display device and the viewer of the display device.

In some implementations, determining the zoom factor for the content based on the distance between the display device and the viewer of the display device includes: obtaining one or more properties of the content; obtaining one or more specifications of the display device; obtaining at least one of an identity of the viewer and a value representative of the visual acuity of the viewer; and determining the zoom factor for the content based on the one or more properties of the content, the one or more specifications of the display device, the distance between the display device and the viewer of the display device, and at least one of the identity of the viewer and the value representative of the visual acuity of the viewer.

In some implementations, displaying the content on the display device using the zoom factor includes displaying a subset of the content on the display device using the zoom factor. In some implementations, displaying the content on the display device using the zoom factor includes incrementally adjusting a current zoom factor for the content until the zoom factor is reached, and concurrently displaying the content on the display device using the adjusted current zoom factor. In some implementations, the camera is located within a predetermined distance of a plane parallel to a viewing surface of the display device. In some implementations, a lens of the camera is oriented perpendicular to a plane parallel to a viewing surface of the display device. In some implementations, the host device is a television set top box. In some implementations, the camera is uncalibrated.

Some implementations include a system configured to determine a zoom factor of content displayed on a display device. In some implementations, the system includes: at least one processor; memory; and at least one program stored in the memory and executable by the at least one processor, the at least one program including instructions to determine a zoom factor of content displayed on a display device, and subsequently display the content according to the zoom factor. In some implementations, the program includes instructions that when executed cause the at least one processor to: obtain an image from a camera oriented toward a viewing position of the display device, the image including a viewer of the display device; normalize the image based on a specification of the camera to produce a normalized image; analyze the normalized image to determine a distance between the display device and the viewer of the display device; determine a zoom factor for content based on the distance between the display device and the viewer of the display device; and display content on the display device using the zoom factor.

Some implementations include a non-transitory computer readable storage medium storing at least one program configured for execution by at least one processor of a computer system. In some implementations, the at least one program includes instructions that when executed cause the at least one processor to determine a zoom factor of content displayed on a display device, and subsequently display the content according to the zoom factor. More specifically, in some implementations, the program includes instructions that when executed cause the at least one processor to: obtain an image from a camera oriented toward a viewing position of the display device, the image including a viewer of the display device; normalize the image based on a specification of the camera to produce a normalized image; analyze the normalized image to determine a distance between the display device and the viewer of the display device; determine a zoom factor for content based on the distance between the display device and the viewer of the display device; and display content on the display device using the zoom factor.

Some implementations include a system configured to determine a zoom factor of content displayed on a display device. In some implementations, the system includes: means for obtaining an image from a camera oriented toward a viewing position of the display device, the image including a viewer of the display device; means for normalizing the image based on a specification of the camera to produce a normalized image; means for analyzing the normalized image to determine a distance between the display device and the viewer of the display device; mean for determining a zoom factor for content based on the distance between the display device and the viewer of the display device; and means for displaying content on the display device using the zoom factor.

BRIEF DESCRIPTION OF THE DRAWINGS

The subject matter disclosed herein are illustrated by way of example, and not by way of limitation, in the figures of the accompanying drawings. Like reference numerals refer to corresponding parts throughout the drawings.

FIG. 8 is a flowchart of a method for determining metrics for physical features of a viewer, according to some aspects.

FIG. 9 is a flowchart of another method for determining metrics for physical features of a viewer, according to some aspects.

FIG. 10 is a flowchart of a method for determining a zoom factor for content based on a distance between a display device and a viewer of the display device, according to some aspects.

DETAILED DESCRIPTION

The subject matter described herein provide techniques for determining a zoom factor of content displayed on a display device. In some aspects, an image is obtained from a camera oriented toward a viewing position of the display device, where the image includes a viewer of the display device. Next, the image is normalized based on specification of the camera to produce a normalized image. The normalized image is analyzed to determine a distance between the display device and the viewer of the display device. A zoom factor for content is then determined based on the distance between the display device and the viewer of the display device. Content is then displayed on the display device using the zoom factor.

Figure 1:
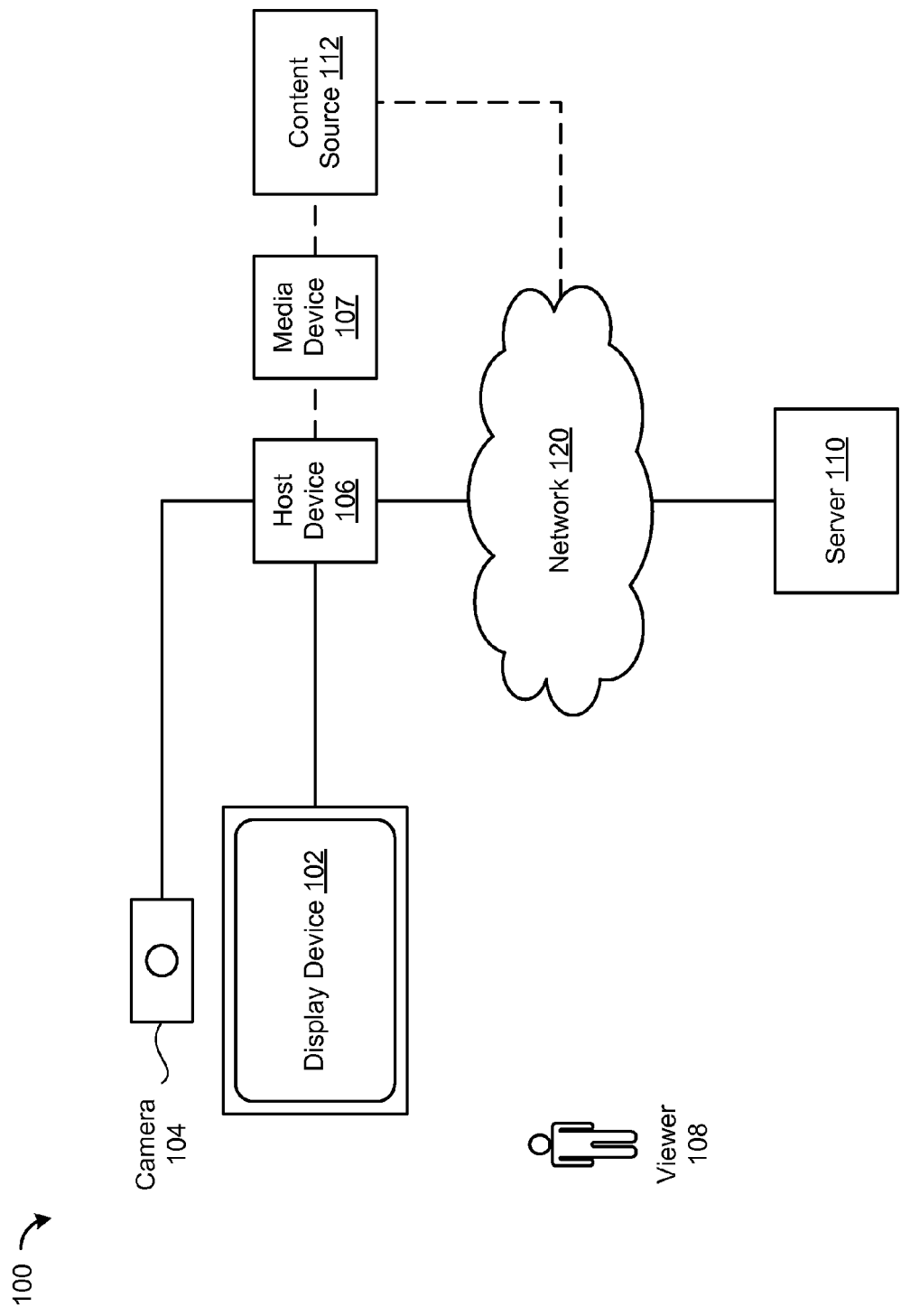
FIG. 1 is a block diagram illustrating a network system, according to some aspects.

FIG. 1 is a block diagram illustrating a network system 100, according to one aspect. The network system 100 includes a host device 106 coupled to a display device 102 that is being viewed by a viewer 108. The host device 106 is configured to display content on the display device 102. In some implementations, the host device 106 applies a zoom factor to the content to adjust the size of the content prior to displaying the content on the display device 102 (or prior to causing the content to be displayed on the display device 102). The zoom factor enlarges or reduces the size of the content and is determined based on factors including, but not limited to, a distance between the display device 102 and the viewer 108, the specifications of the display device 102, the properties of the content, a visual acuity of the viewer 108, and the like. In some implementations, the host device 106 applies the zoom factor to a portion of the content (e.g., text only, text and images, images only, etc.). The process of determining the zoom factor is described below with reference to FIGS. 2A, 2B, and 6-13.

In some implementations, the host device 106 includes a computer system. For example, the computer system may include, but is not limited to, a laptop computer system, a desktop computer system, a mobile telephone, a smartphone, a table computer system, a personal digital assistant, or a server. In some implementations, the host device 106 includes a television set top box. In some implementations, the host device 106 is coupled to the display device 102 via a network (e.g., a wired network, a wireless network, etc.). In some implementations, the host device 106 is coupled to the display device 102 via a peripheral cable (e.g., a USB cable, HDMI cable, DVI cable, etc.).

A viewer 108 is located at a viewing position of the display device 102. For example, the viewer 108 may be sitting on a couch in a room including the display device 102. In some implementations, the display device 102 includes multiple viewing positions. For example, the viewing positions of the display device 102 include any locations that are within the viewing angle of the display device (e.g., a 160 degree cone from the front of the display device 102).

As illustrated in FIG. 1, a camera 104 is coupled to the host device 106. In some implementations, the camera 104 is coupled to the host device 106 via a network (e.g., a wired network, a wireless network, etc.). In some implementations, the camera 104 is coupled to the host device 106 via a peripheral cable (e.g., a USB cable, HDMI cable, DVI cable, etc.).

In some implementations, the camera 104 is oriented toward viewing positions of the display device 102. For example, if the display device 102 is a television set, the camera 104 may be oriented toward couches where viewers of the television set typically sit. In some implementations, a lens of the camera 104 is oriented perpendicular to a plane parallel to a viewing surface of the display device 102. In other words, the field of view of the camera 104 is perpendicular to a plane parallel to a viewing surface of the display device 102. In some implementations, the camera 104 is located within a predetermined distance of a plane parallel to a viewing surface of the display device 102. For example, the predetermined distance may be zero, and thus, the camera 104 is located on the same plane as the viewing surface of the display device 102. In another example, the predetermined distance is five inches, and thus, the camera 104 may be located five inches in front of or behind a plane parallel to the plane of the viewing surface of the display device.

In some implementations, the camera 104 is uncalibrated. In other words, the image produced by the camera is not calibrated against a reference (e.g., a reference image) so that distances from the camera lens to the objects in the image can be determined based on the image. In some implementations, the camera 104 does not include distance measuring and/or range finding functionality. Thus, the camera 104 cannot by itself determine the distance of objects in an image produced by the camera 104. In some implementations, the camera 104 is a webcam. The webcam may be a standalone webcam or a webcam built into the display device 102.

In some implementations, the host device 106 determines a distance between the display device 102 and the viewer 108 based on an image obtained from the camera 104. These implementations are described in more detail below with reference to FIGS. 2A, 2B, and 6-13.

In some implementations, the host device 106 obtains content to be displayed on the display device 102 from a server 110 via network 120. For example, the host device 106 may obtain a video (e.g., movie, television program, etc.) that is hosted on the server 110. Network 120 may generally include any type of wired or wireless communication channel capable of coupling together computing nodes. This includes, but is not limited to, a local area network, a wide area network, or a combination of networks. In some implementations, network 120 includes the Internet.

In some implementations, the host device 106 obtains content to be displayed on the display device 102 from a content source 112. The content source 112 includes, but is not limited to, a streaming media service, a video-on-demand service, an over-the-air television service, a cable television service, a satellite television service, and/or an Internet Protocol television service. In some implementations, the host device 106 is coupled to the content source 112 via network 120. In some implementations, the host device 106 is coupled to a media device 107 that provides the host device 106 with access to the content source 112 (e.g., via an over-the-air television service, a cable television service, a satellite television service).

Note that although FIG. 1 shows one instance for each of the host device 106, the media device 107, the server 110, and the content source 112, multiple host devices, media devices, servers, and content sources may be present in the network system 100.

Also note that each of the server 110 and the content source 112 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Moreover, note that although the one aspect described herein refer to the host device 106, the media device 107, the server 110, and the content source 112, the implementation may be applied to multiple host devices, media devices, servers, and content sources. Furthermore, the functionality of any of the server 110 and the content source 112 may be implemented within a single server (or a set of distributed servers). For example, the functionality of the server 110 and the content source 112 may be located on the same server (or the same set of distributed servers).

Figure 2A:
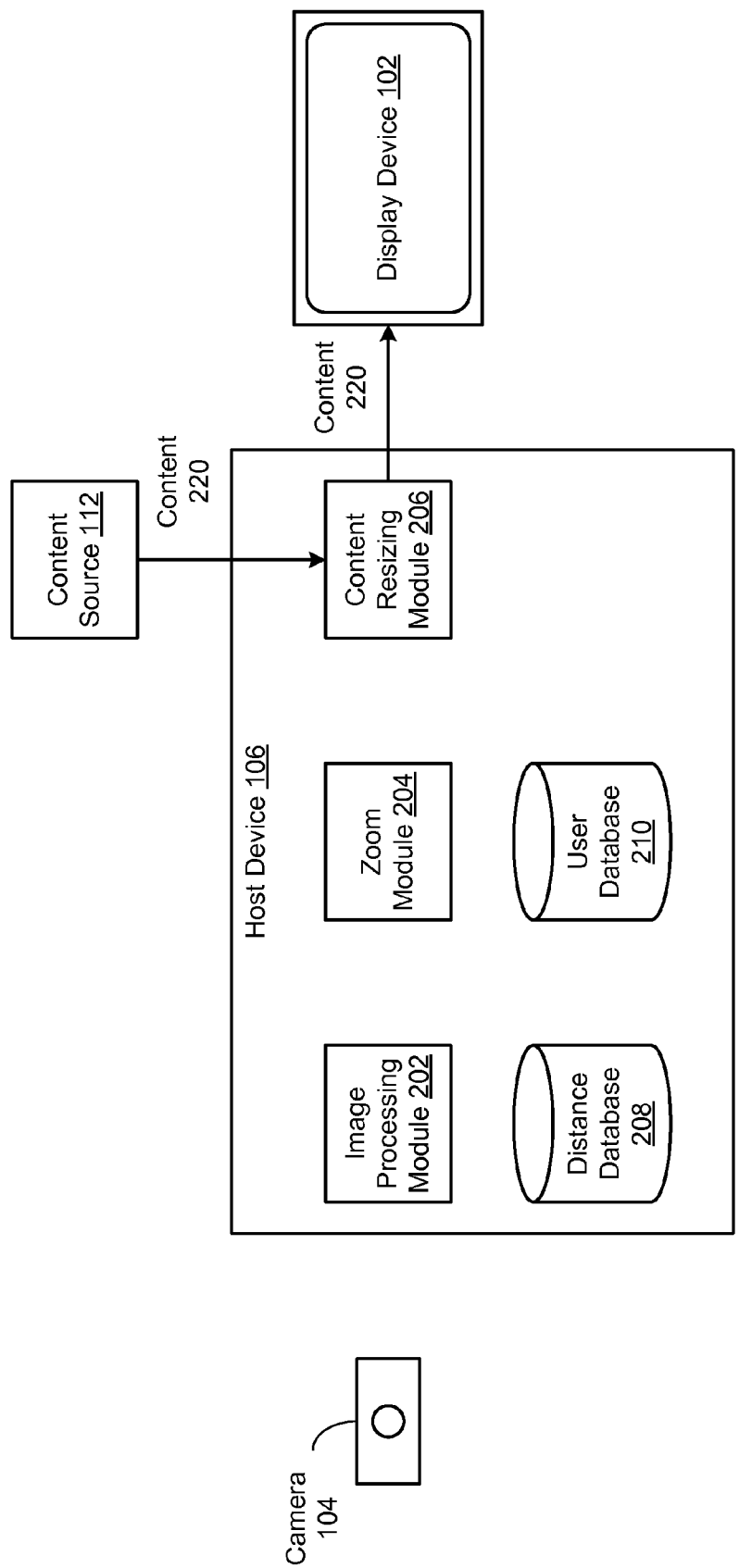
FIG. 2A is a block diagram illustrating a process for displaying content on a display device, according to some aspects.
Figure 2B:
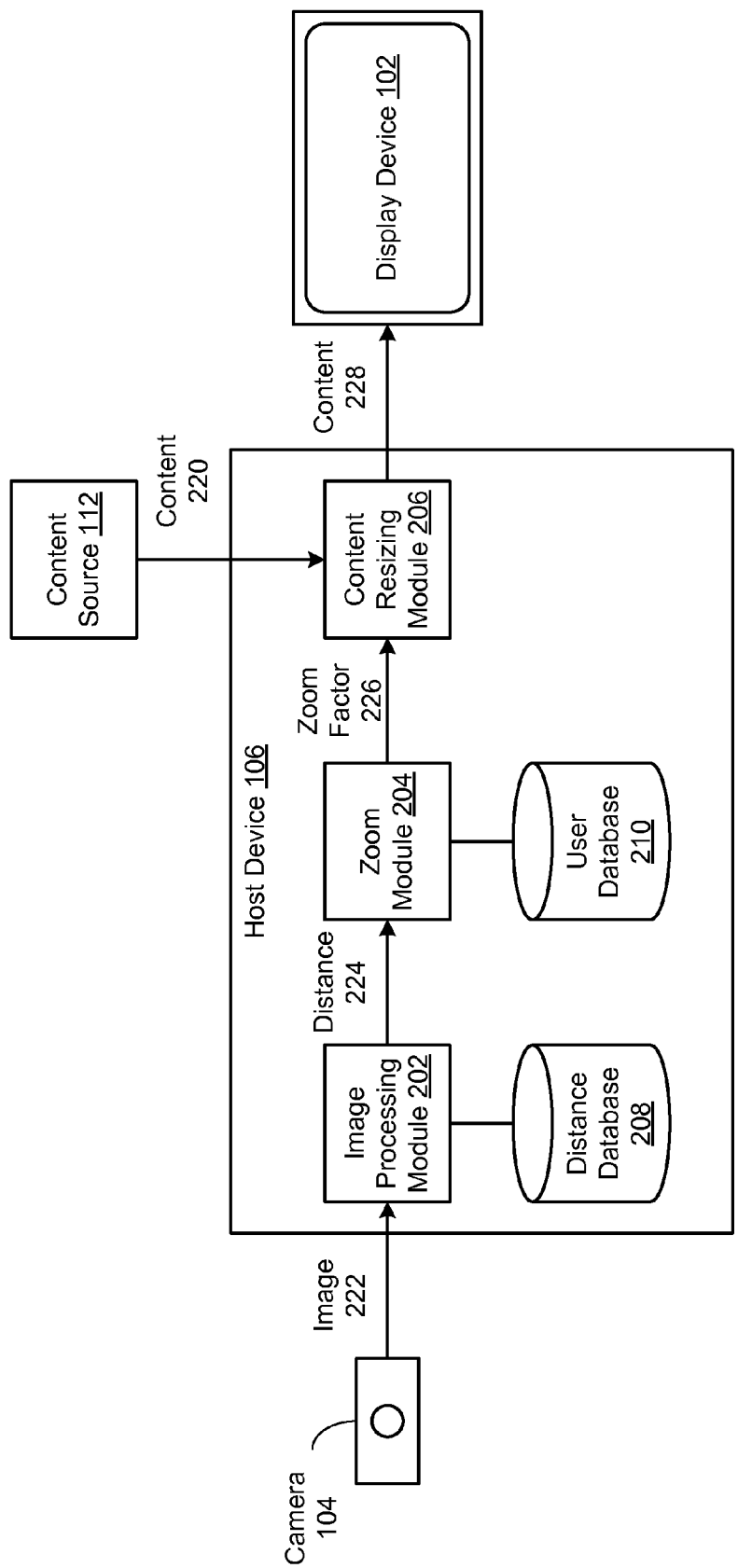
FIG. 2B is a block diagram illustrating a process for determining a zoom factor for content displayed on a display device, according to some aspects.

FIGS. 2A and 2B are block diagrams illustrating a process for the host device 106 displaying content on the display device 102 (or causing content to be displayed on the display device 102), according to some aspects. In some implementations, the host device 106 includes an image processing module 202, a zoom module 204, a content resizing module 206, a distance database 208, and a user database 210. These components of the host device 106 are described in more detail below.

In FIG. 2A, the host device 106 obtains content 220 from the content source 112 and does not resize the content 220 prior to displaying the content 220 on the display device 102. In other words, the content resizing module 206 applies a zoom factor of one to the content 220 so that the content 220 zoom in or zoom out the content prior to displaying the content on the display device 102. Note that the host device 106 may alternatively obtain content 220 from the server 110.

In FIG. 2B, the host device 106 uses an image obtained from the camera 104 to determine a zoom factor for content and displays the content on the display device 102 (or causes the content to be displayed on the display device 102) using the zoom factor. As illustrated in FIG. 2B, the image processing module 202 obtains an image 222 from the camera 104 that is oriented toward a viewing position of the display device 102, where the image 222 includes the viewer 108 of the display device 102. In some implementations, the image processing module 202 is included in means for obtaining an image from a camera oriented toward a viewing position of the display device, the image including a viewer of the display device.

Images that are taken from the same position and angle, but from different cameras may not be the same. For example, the specifications of the lens of a camera (e.g., the effective zoom, focal length, etc.), the specifications of the image sensor of the camera (e.g., dimensions of the image sensor, resolution of the image sensor, etc.), and/or the crop factor of the imaging sensor of the camera (e.g., the area of the imaging sensor of the camera sensor with respect to a reference imaging sensor) affect the image produced by the camera. Accordingly, objects in a first image taken from a particular position and a particular angle may appear to be larger than the objects in a second image taken from the particular position and the particular angle. Thus, in some implementations, the image processing module 202 normalizes the image based on the specifications of the camera 104 to produce a normalized image. In some implementations, the image processing module 202 normalizes the image based on a specification of the camera by scaling the image based at least in part on specifications of a lens of the camera, specifications of an image sensor of the camera, and/or a crop factor of the imaging sensor of the camera. In some implementations, the image processing module 202 is included in means for normalizing the image based on a specification of the camera to produce a normalized image. The normalized image from a first camera is comparable to normalized images from other cameras, and therefore, can be used to distances of objects in the normalized image. For example, the normalized image may be scaled to remove the effects of the zoom level of the lens of the camera and a crop factor of the camera. In some implementations, the image processing module 202 normalizes the image to be comparable to an image produced by a predetermined camera sensor (i) having predetermined specifications and a predetermined crop factor and (ii) using a predetermined lens at a predetermined zoom level (or focal length). For example, the image processing module 202 may normalize the image to be comparable to an image produced by a 24 megapixel 35 mm (full-frame) camera sensor with a crop factor of 1.0 and using a lens with a focal length of 35 mm (e.g., a fixed 35 mm lens or a zoom lens set to a 35 mm focal length).

The image processing module 202 analyzes the image 222 (or the normalized image) to determine a distance 224 between the display device 102 and the viewer 108 of the display device 102. In some implementations, the image processing module 202 is included in means for analyzing the normalized image to determine a distance between the display device and the viewer of the display device. In some implementations, the image processing module 202 identifies the viewer 108 in the image 222 (or the normalized image) and determines metrics for physical features (e.g., metrics for physical features 318, FIGS. 3 and 4) of the viewer 108. The physical features of the viewer 108 may include, but are not limited to, facial features (e.g., eyes, ears, a mouth, a nose, cheeks, a forehead, and a chin), limbs (e.g., arms, legs), and a torso. The metrics for the physical features of the viewer 108 may include, but are not limited to, an area of one or more physical features of the viewer 108 (e.g., an area of a face of the viewer 108, an area of a portion of the face of the viewer 108, etc.) and/or the distance between two or more physical features of the viewer 108 (e.g., a distance between the eyes of the viewer 108, a distance between the ears of the viewer 108, etc.). In some implementations, the metrics for the physical features of the viewer 108 are expressed in units of pixels. For example, a distance between two physical features may be expressed in a pixel distance (e.g., 20 pixels). In another example, an area of a physical feature may be expressed as a pixel area (e.g., 20 pixels by 15 pixels, 30 square pixels, etc.). The image processing module 202 then uses the metrics for the physical features of the viewer 108 to determine the distance 224 between the display device 102 and the viewer 108. For example, if the distance between the eyes of the viewer 108 is 40 pixels, the image processing module 202 may determine that the distance 224 between the viewer 108 and the display device 102 is 5 feet. In another example, if the distance between the eyes of the viewer 108 is 25 pixels and the area of the face is 950 square pixels, the image processing module 202 may determine that the distance 224 between the viewer 108 and the display device 102 is 10 feet.

In some implementations, the image processing module 202 determines the distance 224 between the display device 102 and the viewer 108 by querying a distance database 208. In some implementations, the distance database 208 includes mappings between a value (or a range of values) of a metric for a physical feature of a viewer and a distance (or ranges of distances) between the viewer and a display device corresponding to the value of the metric for the physical feature of the viewer. For example, if the metric is the distance between the eyes of a viewer, the distance database 208 may include the follow mappings between the value of the metric for the physical feature of a viewer and the distance between the viewer and the display device:

5 pixels (or 0-5 pixels) between the eyes of the viewer corresponds to a distance of 15 feet (or 11 to 15 feet);
  10 pixels (or 6-10 pixels) between the eyes of the viewer corresponds to a distance of 10 feet (or 6 to 10 feet); and
  15 pixels (or 11-15 pixels) between the eyes of the viewer corresponds to a distance of 5 feet (or 0 to 5 feet).

In some implementations, the distance database 208 includes mappings between values (or ranges of values) of multiple metrics for physical features of a viewer (e.g., mapping values 320, FIGS. 3 and 4) and a distance (or ranges of distances) between the viewer and a display device corresponding to the values of the metrics for the physical feature of the viewer. For example, the distance database 208 may include mappings between values of (i) the distance between the eyes of a viewer and (ii) the area of the face of the viewer and a distance (or ranges of distances) between the viewer and a display device corresponding to the values of the metrics for the physical feature of the viewer. Example mappings between the values of (i) the distance between the eyes of a viewer and (ii) the area of the face of the viewer and a distance (or ranges of distances) between the viewer and a display device may include:

5 pixels (or 0-5 pixels) between the eyes of the viewer and 50 square pixels (or 0 to 50 square pixels) for the area of the face of the viewer corresponds to a distance of 15 feet (or 11 to 15 feet);
  10 pixels (or 6-10 pixels) between the eyes of the viewer and 200 square pixels (or 51 to 200 square pixels) for the area of the face of the viewer corresponds to a distance of 10 feet (or 6 to 10 feet); and
  15 pixels (or 11-15 pixels) between the eyes of the viewer and 450 square pixels (or 201 to 450 square pixels) for the area of the face of the viewer corresponds to a distance of 5 feet (or 0 to 5 feet).

In some implementations, the distance database 208 includes mappings for all of the possible values of the metric for the physical feature of a viewer and a distance (or range of distances) between the viewer and a display device corresponding to the value of the metric for the physical feature of the viewer. In some implementations, the distance database 208 includes mappings for a subset of the possible values of the metric for the physical feature of a viewer and a distance (or range of distances) between the viewer and a display device corresponding to the value of the metric for the physical feature of the viewer. In some implementations, when the distance database 208 does not include mappings for all of the possible values of the metric for the physical feature of a viewer and a distance (or range of distances) between the viewer and a display device corresponding to the value of the metric for the physical feature of the viewer, the image processing module 202 uses extrapolation to determine the distance between the viewer and the display device based on the values of the metric for the physical feature of a viewer that are available in the distance database 208. In some implementations, when the distance database 208 does not include mappings for all of the possible values of the metric for the physical feature of a viewer and a distance (or range of distances) between the viewer and a display device corresponding to the value of the metric for the physical feature of the viewer, the image processing module 202 uses interpolation to determine the distance between the viewer and the display device based on the values of the metric for the physical feature of a viewer that are available in the distance database 208. In some implementations, the distance database 208 is included in means for analyzing the normalized image to determine a distance between the display device and the viewer of the display device.

In some implementations, the image processing module 202 determines multiple candidate distances between the viewer 108 and the display device 102 based on values for sets of metrics for the physical features of the viewer 108 and applies one or more heuristic functions to the candidate distances to determine the distance between the viewer 108 and the display device 102. For example, the image processing module 202 may determine a first candidate distance between the viewer 108 and the display device 102 based on the distance between the eyes of the viewer 108 (e.g., by querying the distance database 208). The image processing module 202 may then determine a second candidate distance between the viewer 108 and the display device 102 based on an area of a face of the viewer 108 (e.g., by querying the distance database 208). The image processing module 202 may then determine the distance between the viewer 108 and the display device 102 using a weighted average of the first candidate distance and the second candidate distance. In some implementations, the weighting of a respective candidate distance is based on an accuracy of using respective metrics for the physical features of the viewer 108 to determine the respective candidate distance. For example, using the distance between the eyes of the viewer 108 to determine the distance between the viewer 108 and the display device 102 may be more accurate than using the area of the face of the viewer 108 to determine the distance between the viewer 108 and the display device 102. Accordingly, the first candidate distance is weighted more than the second candidate distance. Note that functions other than the weighted average may be used to determine the distance between the viewer 108 and the display device 102 using the candidate distances. As discussed above, the distance database 208 may include mappings between multiple metrics for physical features of a viewer and a distance between the viewer and the display device 102 (e.g., a distance between the eyes of a viewer and an area of the face of the viewer may be mapped to a particular distance between the viewer 108 and the display device 102). Accordingly, a respective candidate distance may be based on multiple values for metrics for physical features of a viewer.

In some implementations, the number of sets of metrics for the physical features of the viewer 108 that are used is predetermined (e.g., 3 sets). In some implementations, the number of sets of metrics for the physical features of the viewer 108 that are used is dynamically determined (e.g., 3 sets). For example, the image processing module 202 may determine candidate distances until the distance between the viewer 108 and the display device 102 converges to within a predetermined percentage (or value).

In some implementations, the mappings between the metrics for physical features of viewers and distances (or ranges of distances) between the viewer and the display device 102 corresponding to the metrics for the physical features of the viewers are obtained from normalized images obtained from a plurality of cameras in which a plurality of viewers having various metrics for physical features are located at various known distances from a display device 102.

In some implementations, the image processing module 202 determines the distance 224 between the display device 102 and the viewer 108 by using metrics for physical features of the viewer 108 and metrics for predetermined objects in the image 222. The predetermined objects may include, but are not limited to, a couch, a table, a seat, other objects typically found in viewing positions of display devices, and a calibrating object (e.g., an object having known dimensions). The metrics for the predetermined objects may include, but are not limited to, dimensions of the predetermined objects and/or an area of the predetermined objects. For example, the image processing module 202 may determine candidate distances between the viewer 108 and the display device 102 based on values for sets of metrics for the physical features of the viewer 108. The image processing module 202 may also determine candidate distances between the viewer 108 and the display device 102 based on values for metrics for predetermined objects in the image 222. The image processing module 202 may then apply one or more heuristic functions to the candidate distances to determine the distance between the viewer 108 and the display device 102. As discussed above, the heuristic functions may bias (or weight) candidate distances based on an accuracy of using the metrics for the physical features of the viewer 108 and/or the metrics for predetermined objects in the image 122 to determine the distance between the viewer 108 and the display device 102.

The process of analyzing an image to determine a distance between a display device and a viewer of the display device is described in more detail below with reference to FIGS. 10-12.

The zoom module 204 determines a zoom factor 226 for content based at least in part on the distance 224 between the display device 102 and the viewer 108. In some implementations, the zoom module 204 determines the zoom factor 226 for the content based on at least one of the following factors: the distance 224 between the display device 102 and the viewer 108, properties of the content (e.g., font family, font size, image size, image resolution), specifications of the display device 102 (e.g., a size of the display device, a resolution of the display device, etc.), an identity of the viewer 108 (e.g., obtained using facial recognition, obtained from login credentials of the viewer 108 when the viewer 108 uses a remote controller, mobile application, etc.), and a visual acuity of the viewer 108 (e.g., obtained from a user profile for the viewer 108 that is included in the user database 210, obtained from a vision test given to the viewer prior to determining the zoom factor, etc.). In some implementations, the zoom module 204 is included in means for determining a zoom factor for content based on the distance between the display device and the viewer of the display device. In some implementations, the user database 210 is included in means for determining a zoom factor for content based on the distance between the display device and the viewer of the display device.

The content resizing module 206 applies the zoom factor 226 to the content 220 to produce content 228 and displays the content 228 on the display device 102 (or causes the content 228 to be displayed on the display device 102). In some implementations, the content resizing module 206 is included in means for displaying content on the display device using the zoom factor. In some implementations, the display device 102 is included in means for displaying content on the display device using the zoom factor. Note that when the zoom factor 226 increases the size of the content 220 to produce content 228, the viewable portion of the content 228 (e.g., the portion of the content 228 that is actually displayed in the display device 102) includes a subset of the content 220 that was originally viewable on the display device 102. Similarly, when the zoom factor 226 decreases the size of the content 220 to produce content 228, the viewable portion of the content 228 (e.g., the portion of the content 228 that is actually displayed in the display device 102) includes more portions of the content 220 (if available) than was originally viewable on the display device 102.

In some implementations, a subset of the content 220 is displayed using the zoom factor 226. For example, the content resizing module 206 may only apply the zoom factor 226 to the text while leaving images and other portions of the content 220 unmodified. In another example, the content resizing module 206 may only apply the zoom factor 226 to the images while leaving text and other portions of the content 220 unmodified.

In some implementations, after displaying the content 228 on the display device 102, the host device 106 receives input from the viewer 108 regarding the appropriateness of the zoom factor 226 and adjusts the zoom factor 226 based on the input from the viewer. For example, the host device 106 may prompt the viewer 108 to determine whether the zoom factor 226 makes the content 228 viewable to the viewer 108 (e.g., allows the viewer 108 to be able to see sufficient details in the content 228 that were previously not viewable in the content 220). In another example, the host device 106 receives input from the viewer 108 without prompting the viewer 108 (e.g., the viewer 108 presses a zoom in or zoom out button on a remote controller, etc.).

Note that although FIGS. 2A and 2B illustrate the distance database 208 and the user database 210 as being included in the host device 106, the distance database 208 and/or the user database 210 may be included in the server 110. Thus, the image processing module 202 issues queries to the server 110 to obtain the aforementioned mappings from the distance database 208 and/or the zoom module 204 issues queries to the server 110 to obtain user information (e.g., identities of a viewer, visual acuity of the viewer, etc.) from the user database 210.

Also note that the discussion above refers to various modules of the host device 106 performing various operations. However, a subset of the modules of the host device 106 may be included in the server 110. Thus, in some implementations, at least a subset of the image processing module 202, the zoom module 204, and the content resizing module 206 are included in the server 110 instead of being included in the host device 106. In these implementations, the host device 106 transmits data to the server 110 that is required for the modules that are included in the server 110 to perform their respective operations and the server 110 returns data that is required for modules that remain on the host device 106 to perform their respective operations. For example, if only the image processing module 202 is included in the server 110, the host device 106 may transmit the image 222, specification of the camera 104, specifications of the display device 102, and/or specifications of the content 220 to the server 110. The server 110 then transmits the distance 224 to the host device 106 so that the zoom module 204 can determine the zoom factor 226.

Figure 3:
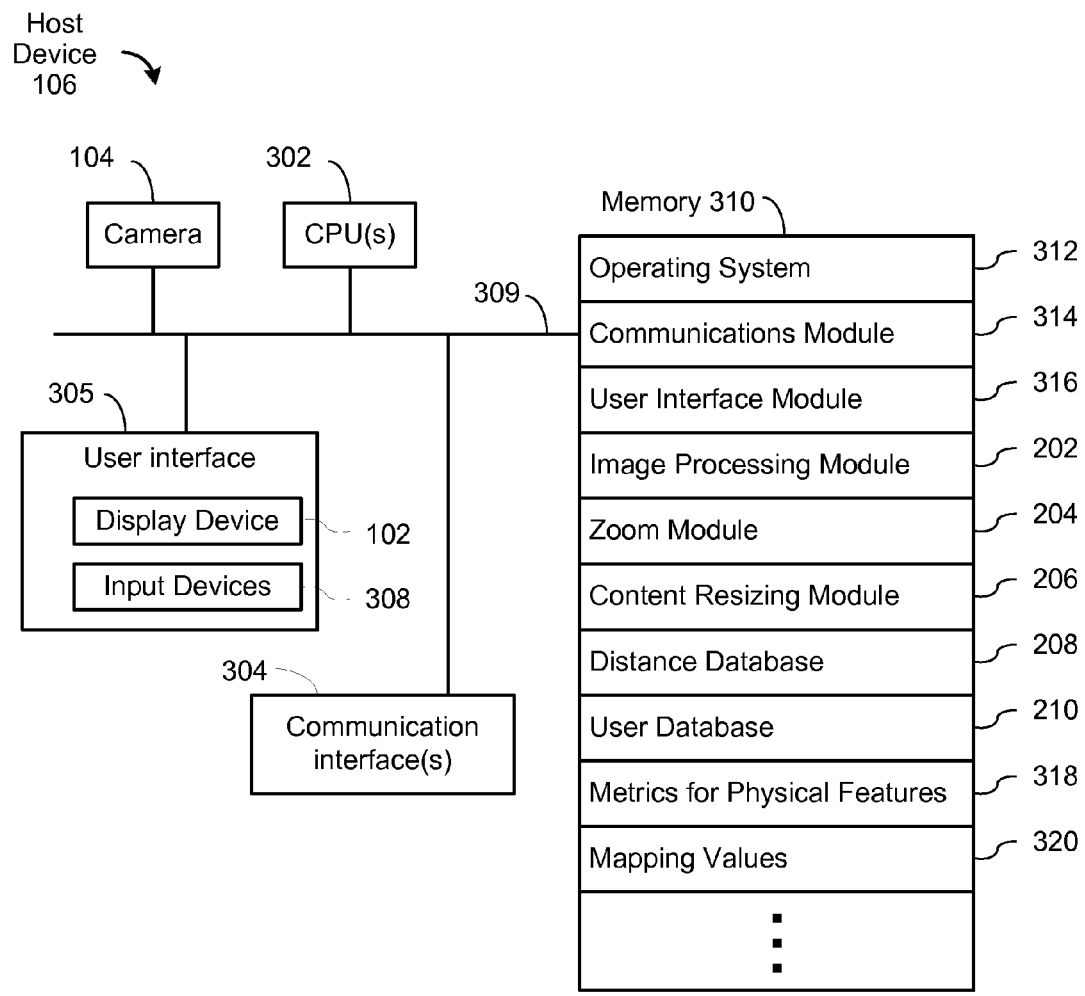
FIG. 3 is a block diagram illustrating a host device, according to some aspects.

FIG. 3 is a block diagram illustrating the host device 106, according to some aspects. The host device 106 typically includes one or more processing units (CPU's, sometimes called processors) 302 for executing programs (e.g., programs stored in memory 310), one or more network or other communications interfaces 304, memory 310, and one or more communication buses 309 for interconnecting these components. The communication buses 309 may include circuitry (sometimes called a chipset) that interconnects and controls communications between system components. The host device 106 optionally includes a user interface 305 comprising the display device 102 and input devices 308 (e.g., keyboard, mouse, touch screen, keypads, etc.). In some implementations, the host device 106 includes the camera 104. Memory 310 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some aspects, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting the host device 106 to other computers via the one or more communication interfaces 304 (wired or wireless) and one or more communication networks, such as the Internet, other wide area networks, local area networks, metropolitan area networks, and so on;
- a user interface module 316 that receives commands from the user via the input devices 308 and generates user interface objects in the display device 102;
- the image processing module 202 that normalizes an image (e.g., the image 222), identifies a viewer in the image, and determines a distance between a viewer and the display device 102, as described herein;
- the zoom module 204 that determines a zoom factor (e.g., the zoom factor 226) based at least in part on the distance between a viewer and the display device 102, as described herein;
- the content resizing module 206 that applies a zoom factor to content and displays the zoomed (e.g., zoomed in or zoomed out) content on the display device 102 (or causes the zoomed content to be displayed on the display device 102, as described herein;
- the distance database 208 that includes mappings between a value (or a range of values) of a metric for a physical feature of a viewer and a distance (or ranges of distances) between the viewer and a display device corresponding to the value of the metric for the physical feature of the viewer, as described herein; and the user database 210 that includes viewer information, including, but not limited to identifying information for a respective viewer (e.g., demographic information for the respective viewer, a name of the respective viewer, a picture of the respective viewer, etc.) and a visual acuity of the respective viewer, as described herein.

In some aspects, the programs or modules identified above correspond to sets of instructions for performing a function described above. The sets of instructions can be executed by one or more processors (e.g., the CPUs 302). The above identified modules or programs (i.e., sets of instructions) need not be implemented as separate software programs, procedures or modules, and thus various subsets of these programs or modules may be combined or otherwise re-arranged in various aspects. In some aspects, memory 310 stores a subset of the modules and data structures identified above. Furthermore, memory 310 may store additional modules and data structures not described above.

Although FIG. 3 shows a "host device," FIG. 3 is intended more as functional description of the various features which may be present in a host device than as a structural schematic of the aspects described herein. In practice, and as recognized by those of ordinary skill in the art, items shown separately could be combined and some items could be separated.

Figure 4:
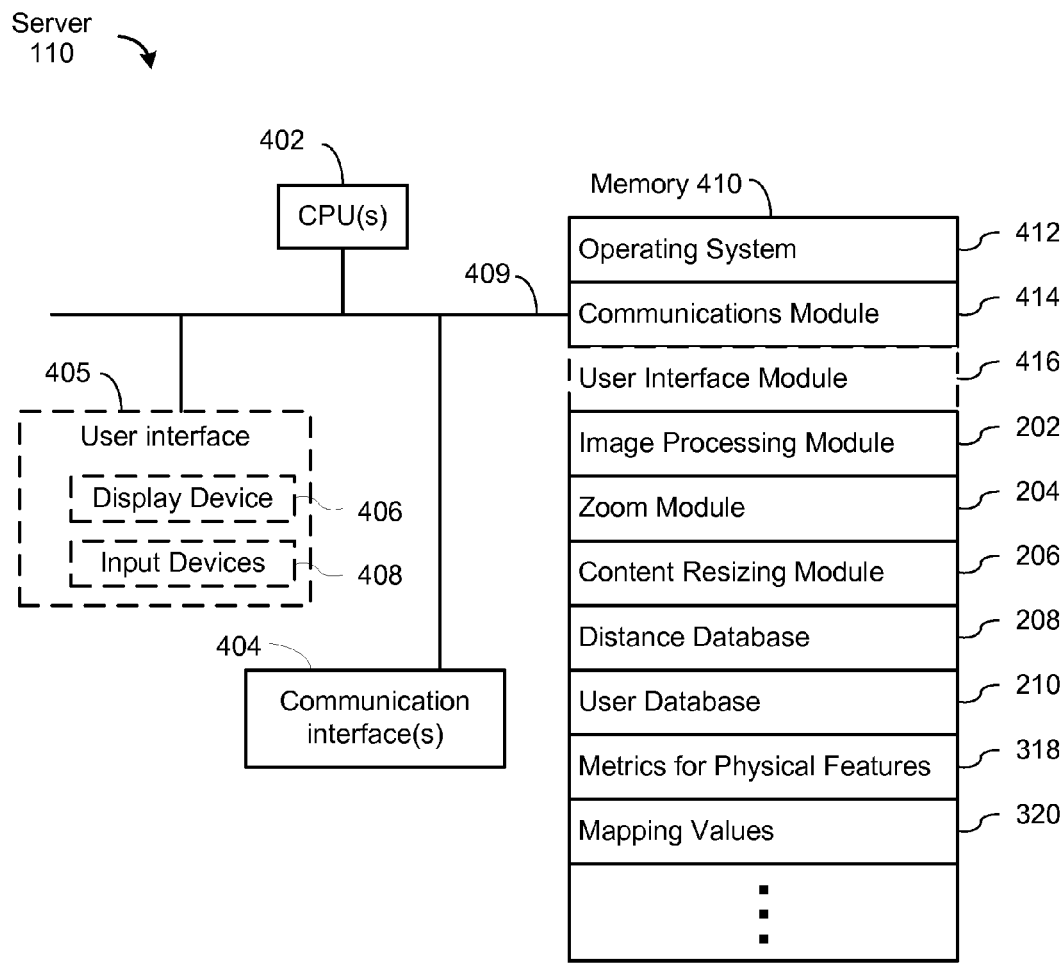
FIG. 4 is a block diagram illustrating a server, according to some aspects.

FIG. 4 is a block diagram illustrating the server 110, according to some aspects. The server 110 typically includes one or more processing units (CPU's, sometimes called processors) 402 for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The server 110 optionally includes (but typically does not include) a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some aspects, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for connecting the server 110 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- the image processing module 202 that normalizes an image (e.g., the image 222), identifies a viewer in the image, and determines a distance between a viewer and the display device 102, as described herein;
- the zoom module 204 that determines a zoom factor (e.g., the zoom factor 226) based at least in part on the distance between a viewer and the display device 102, as described herein;
- the content resizing module 206 that applies a zoom factor to content and displays the zoomed (e.g., zoomed in or zoomed out) content on the display device 102 (or causes the zoomed content to be displayed on the display device 102, as described herein;
- the distance database 208 that includes mappings between a value (or a range of values) of a metric for a physical feature of a viewer and a distance (or ranges of distances) between the viewer and a display device corresponding to the value of the metric for the physical feature of the viewer, as described herein; and
- the user database 210 that includes viewer information, including, but not limited to identifying information for a respective viewer (e.g., demographic information for the respective viewer, a name of the respective viewer, a picture of the respective viewer, etc.) and a visual acuity of the respective viewer, as described herein.

In some aspects, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various aspects. In some aspects, memory 410 stores a subset of the modules and data structures identified above. Furthermore, memory 410 may store additional modules and data structures not described above.

Although FIG. 4 shows a "server," FIG. 4 is intended more as functional description of the various features which may be present in a set of servers than as a structural schematic of the aspects described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 5:
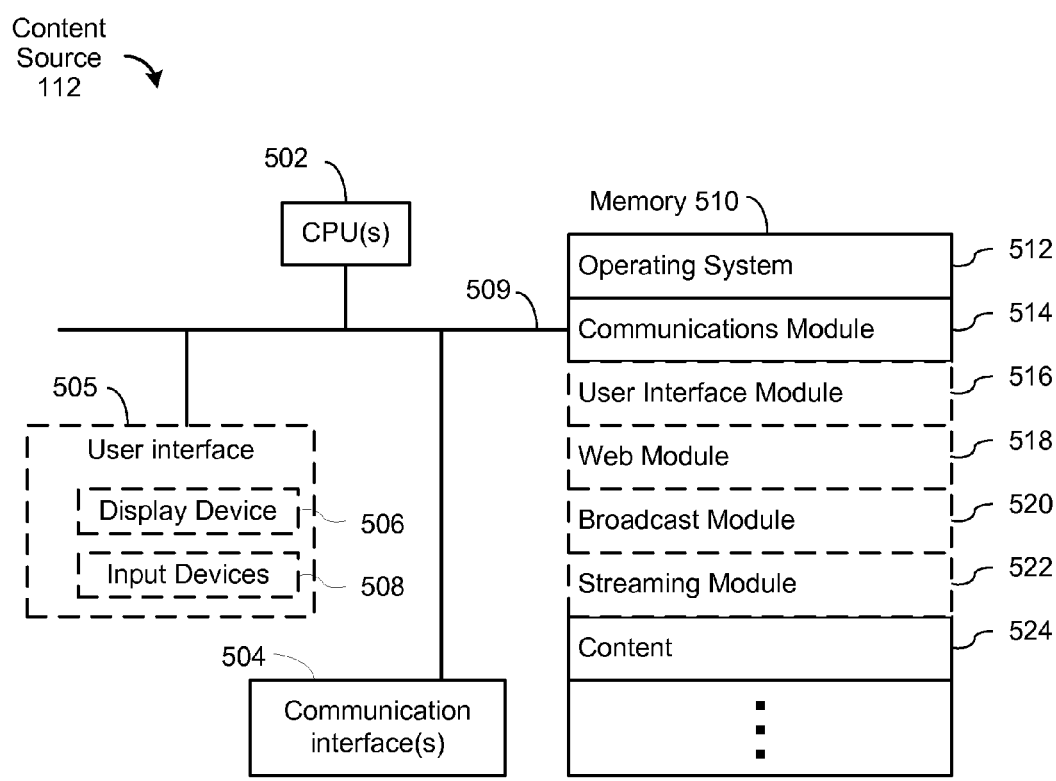
FIG. 5 is a block diagram illustrating a content source, according to some aspects.

FIG. 5 is a block diagram illustrating the content source 112, according to some aspects. The content source 112 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The content source 112 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some aspects, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the content source 112 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- an optional web module 518 that provides an interface that allows host devices (e.g., the host device 106) to access content 524 (e.g., movies, television programs, video clips, etc.) on a website hosted by the content source 112;
- an optional broadcast module 520 to broadcasts the content 524 to the host device 106 through a network (e.g., a satellite television network, a cable television network, an over-the-air network, an Internet Protocol television network, the network 120, etc.); and
- an optional streaming module 522 that streams the content 524 to the host device 106 through a network (e.g., a satellite television network, a cable television network, an over-the-air network, an Internet Protocol television network, the network 120, etc.).

In some aspects, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various aspects. In some aspects, memory 510 stores a subset of the modules and data structures identified above. Furthermore, memory 510 may store additional modules and data structures not described above.

Although FIG. 5 shows a "content source," FIG. 5 is intended more as functional description of the various features which may be present in a set of content sources than as a structural schematic of the aspects described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a content source and how features are allocated among them will vary from one implementation to another, and may depend in part on the amount of data traffic that the system must handle during peak usage periods as well as during average usage periods.

Determining a Zoom Factor of Content

The following discussions of FIGS. 6-13 refer to particular modules of the host device 106 (or the server 110) as performing particular operations. However, the operations discussed below may be performed by other modules of the host device 106 (or the server 110).

Figure 6:
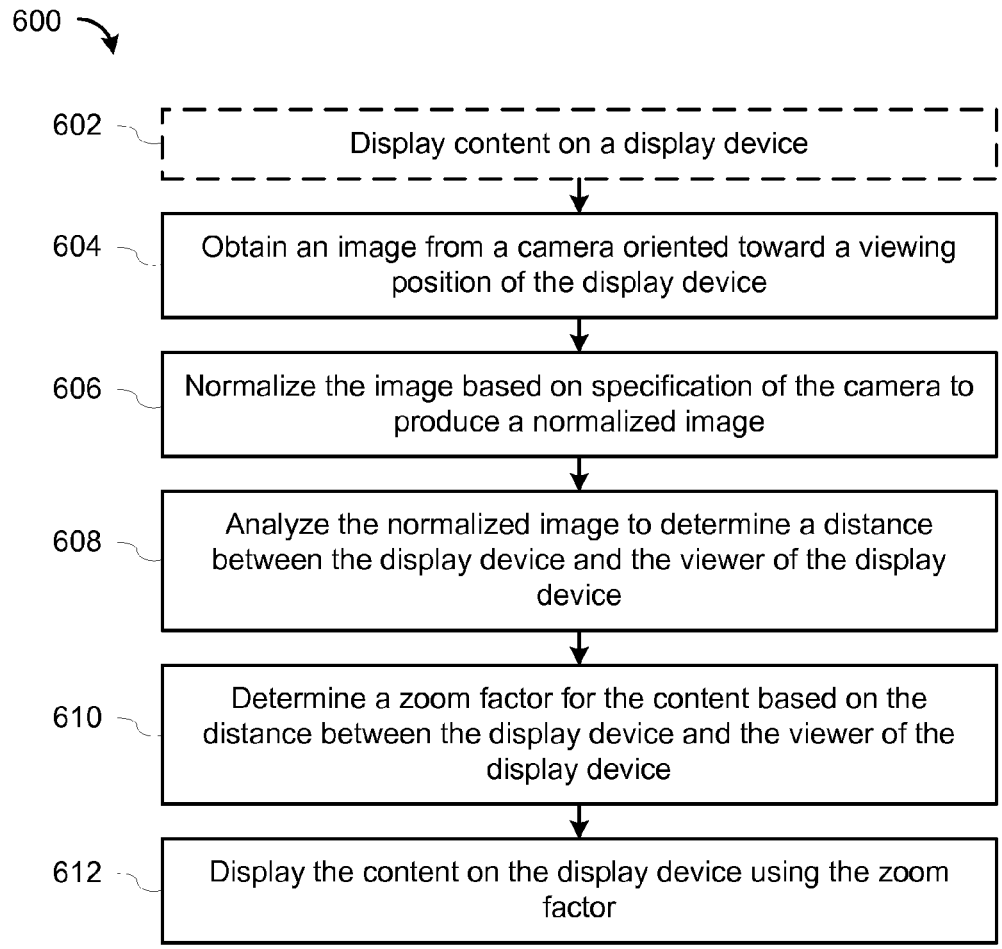
FIG. 6 is a flowchart of a method for determining a zoom factor of content displayed on a display device, according to some aspects.

FIG. 6 is a flowchart of a method 600 for determining a zoom factor of content displayed on the display device 102, according to some aspects. In some implementations, the content resizing module 206 displays content on the display device 102 prior to performing operations 604-612. In some implementations, the operation 602 is omitted.

The image processing module 202 obtains (604) an image (e.g., the image 222) from the camera 104 oriented toward a viewing position of the display device 102, where the image includes a viewer of the display device 102 (e.g., the viewer 108).

The image processing module 202 normalizes (606) the image based on specification of the camera 104 to produce a normalized image. In some implementations, the image processing module 202 normalizes the image based on specification of the camera by scaling the image based at least in part on specifications of a lens of the camera and specifications of an image sensor of the camera.

The image processing module 202 analyzes (608) the normalized image to determine a distance between the display device 102 and the viewer of the display device 102 (e.g., the distance 224). Operation 608 is described in more detail below with reference to FIG. 7.

The image processing module 202 determines (610) a zoom factor for content (e.g., the zoom factor 226) based on the distance between the display device and the viewer of the display device (e.g., the distance 224). Operation 610 is described in more detail below with reference to FIGS. 10-12.

The content resizing module 206 displays (612) content on the display device 102 (or causes the content to be displayed on the display device 102) using the zoom factor. In some implementations, the content resizing module 206 displays a subset of the content on the display device 102 (or causes the content to be displayed on the display device 102) using the zoom factor. For example, the content resizing module 206 may only apply the zoom factor to text of the content. In another example, the content resizing module 206 may only apply the zoom factor to images of the content but not the text.

Figure 7:
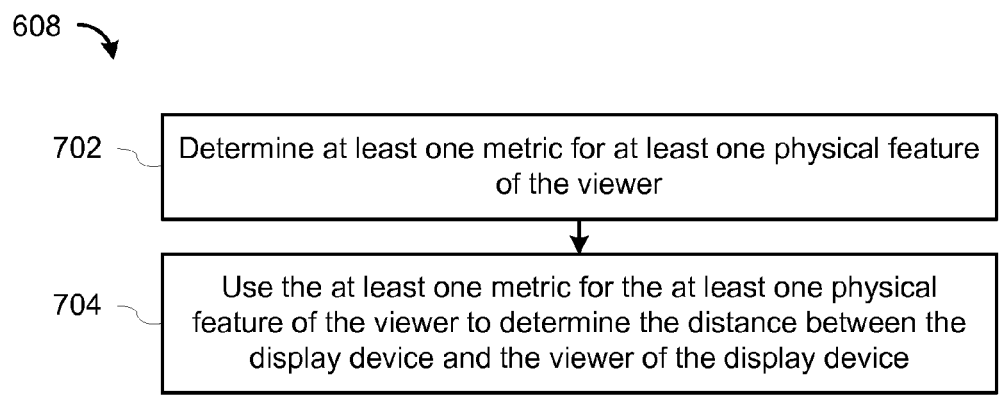
FIG. 7 is a flowchart of a method for analyzing a normalized image to determine a distance between the display device and the viewer of the display device, according to some aspects.

FIG. 7 is a flowchart of a method for analyzing (608, FIG. 6) the normalized image to determine the distance between the display device 102 and the viewer of the display device 102, according to some aspects. The image processing module 202 determines (702) at least one metric for at least one physical feature of the viewer. Operation 702 is described in more detail below with reference to FIGS. 8-9. The image processing module 202 then uses (704) the at least one metric for the at least one physical feature of the viewer to determine the distance between the display device 102 and the viewer of the display device 102.

In some implementations, the at least one metric for the at least one physical feature of the viewer is an area of a face of the viewer. FIG. 8 is a flowchart of a method for determining (702, FIG. 7) metrics for physical features of a viewer when the at least one metric for the at least one physical feature of the viewer is an area of a face of the viewer, according to some aspects. The image processing module 202 identifies (802) the face of the viewer in the image (e.g., using facial recognition techniques) and determines (804) the area of the face of the viewer.

In some implementations, the at least one metric for the at least one physical feature of the viewer is a distance between the eyes of the viewer. FIG. 9 is a flowchart of another method for determining (702, FIG. 7) metrics for physical features of a viewer when the at least one metric for the at least one physical feature of the viewer is a distance between the eyes of the viewer, according to some aspects. The image processing module 202 identifies (902) the eyes of the viewer in the image and determines (904) the distance between the eyes of the viewer.

Note that FIGS. 8 and 9 illustrate two example implementations for determining metrics for physical features of a viewer. In general, the image processing module 202 may determine metrics (values of metrics) for any combination of the physical features described herein (e.g., facial features, limbs, torso, etc.).

FIG. 10 is a flowchart of a method for determining (610, FIG. 6) the zoom factor for content based on the distance between the display device 102 and the viewer of the display device 102, according to some aspects. The zoom module 204 obtains (1002) properties of the content, obtains (1004) specifications of the display device 102, and determines (1006) the zoom factor for the content based on the properties of the content, the specifications of the display device 102, and the distance between the display device 102 and the viewer of the display device 102.

Figure 11:
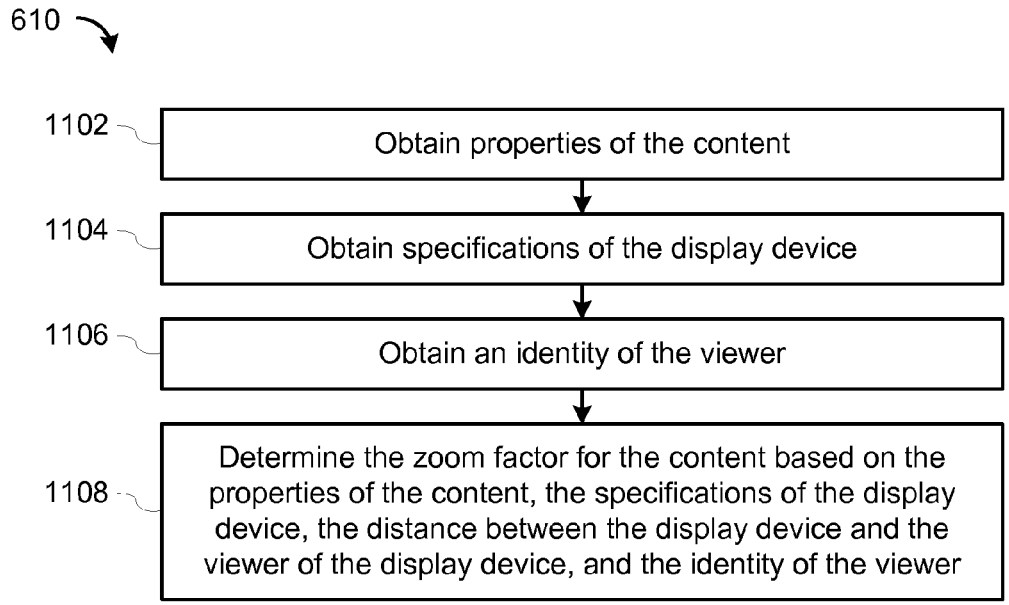
FIG. 11 is a flowchart of another method for determining a zoom factor for content based on a distance between a display device and a viewer of the display device, according to some aspects.

FIG. 11 is a flowchart of another method for determining (610, FIG. 6) the zoom factor for content based on the distance between the display device 102 and the viewer of the display device 102, according to some aspects. The zoom module 204 obtains (1102) properties of the content, obtains (1104) specifications of the display device 102, obtains (1106) an identity of the viewer, and determines (1108) the zoom factor for the content based on the properties of the content, the specifications of the display device 102, the distance between the display device 102 and the viewer of the display device 102, and the identity of the viewer.

Figure 12:
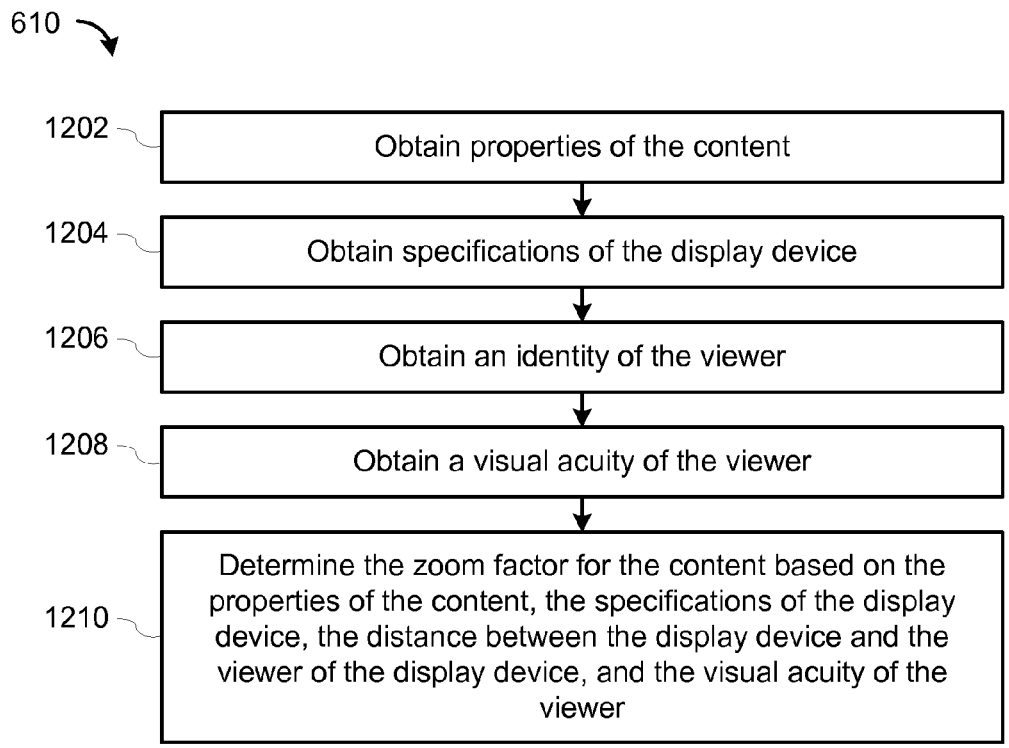
FIG. 12 is a flowchart of another method for determining a zoom factor for content based on a distance between a display device and a viewer of the display device, according to some aspects.

FIG. 12 is a flowchart of another method for determining (610, FIG. 6) the zoom factor for content based on the distance between the display device 102 and the viewer of the display device 102, according to some aspects. The zoom module 204 obtains (1202) properties of the content, obtains (1204) specifications of the display device 102, obtains (1206) an identity of the viewer, obtains (1208) a visual acuity of the viewer, and determines (1210) the zoom factor for the content based on the properties of the content, the specifications of the display device 102, the distance between the display device 102 and the viewer of the display device 102, and the visual acuity of the viewer.

Note that FIGS. 10-12 illustrate three example implementations for determining the zoom factor for content based on the distance between the display device 102 and the viewer of the display device 102. However, in general, the zoom module 204 may determine the zoom factor for the content based on the distance between the display device 102 and the viewer and any combination of the following factors: properties of the content, specifications of the display device 102, an identity of the viewer, and a visual acuity of the viewer.

Figure 13:
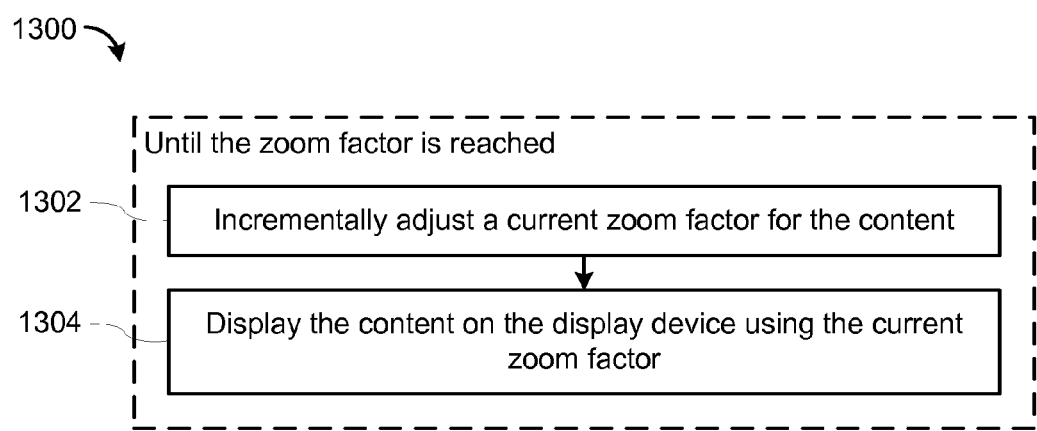
FIG. 13 is a flowchart of a method for incrementally adjusting a current zoom factor of content displayed on a display device, according to some aspects.

In some implementations, the content resizing module 206 transitions between zoom factors over a predetermined time period. The transition may occur in several situations. For example, when the display device 102 is first turned on, an initial zoom factor may be used (e.g., 1). However, after performing the operations described above, a new zoom factor may be determined. Thus, the content resizing module 206 may transition from the initial zoom factor to the new zoom factor. In another example, when a new viewer is detected, the zoom module 204 may determine a new zoom factor. Thus, the content resizing module may transition from the previous zoom factor to the new zoom factor. In these implementations, the content resizing module 206 incrementally adjusts the zoom factor of the content until the final zoom factor of the content is achieved. FIG. 13 is a flowchart of a method for incrementally adjusting a current zoom factor of content displayed on a display device, according to some aspects. Until the zoom factor is reached, the content resizing module 206 incrementally adjusts (1302) a current zoom factor for the content and displays (1304) the content on the display device 102 (or causes the content to be displayed on the display device 102) using the current zoom factor.

The methods illustrated in FIGS. 6-13 may be governed by instructions that are stored in a computer readable storage medium and that are executed by at least one processor of at least one host device (or at least one server). Each of the operations shown in FIGS. 6-13 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for determining a zoom factor of content displayed on a display device, performed on a host device having at least one processor and memory storing at least one program for execution by the at least one processor to perform the method, comprising:
   obtaining an image from a camera oriented toward a viewing position of the display device, the image including a viewer of the display device;
   after obtaining the image, normalizing the image automatically and without user intervention based on a specification of the camera to produce a normalized image, wherein normalizing the image based on the specification of the camera includes scaling the image based at least in part on one or more specifications of the lens of the camera and one or more specifications of the image sensor of the camera;
   analyzing the normalized image to determine a distance between the display device and the viewer of the display device;
   determining a zoom factor for content based on the distance between the display device and the viewer of the display device; and
   displaying content on the display device using the zoom factor.

2. The computer-implemented method of claim 1, wherein analyzing the normalized image to determine the distance between the display device and the viewer of the display device includes:
   determining at least one metric for at least one physical feature of the viewer; and
   using the at least one metric for the at least one physical feature of the viewer to determine the distance between the display device and the viewer of the display device.

3. The computer-implemented method of claim 2, wherein the at least one metric for the at least one physical feature of the viewer is an area of a face of the viewer, and wherein determining the at least one metric for the at least one physical feature of the viewer includes:
   identifying the face of the viewer in the image; and
   determining the area of the face of the viewer.

4. The computer-implemented method of claim 2, wherein the at least one metric for the at least one physical feature of the viewer is a distance between the eyes of the viewer, and wherein determining the at least one metric for the at least one physical feature of the viewer includes:
   identifying the eyes of the viewer in the image; and
   determining the distance between the eyes of the viewer.

5. The computer-implemented method of claim 1, wherein determining the zoom factor for the content based on the distance between the display device and the viewer of the display device includes:
   obtaining one or more properties of the content;
   obtaining one or more specifications of the display device; and
   determining the zoom factor for the content based on the one or more properties of the content, the one or more specifications of the display device, and the distance between the display device and the viewer of the display device.

6. The computer-implemented method of claim 1, wherein determining the zoom factor for the content based on the distance between the display device and the viewer of the display device includes:
   obtaining one or more properties of the content;
   obtaining one or more specifications of the display device;
   obtaining at least one of an identity of the viewer and a value representative of the visual acuity of the viewer; and
   determining the zoom factor for the content based on the one or more properties of the content, the one or more specifications of the display device, the distance between the display device and the viewer of the display device, and at least one of the identity of the viewer and the value representative of the visual acuity of the viewer.

7. The computer-implemented method of claim 1, wherein displaying the content on the display device using the zoom factor includes displaying a subset of the content on the display device using the zoom factor.

8. The computer-implemented method of claim 1, wherein displaying the content on the display device using the zoom factor includes incrementally adjusting a current zoom factor for the content until the zoom factor is reached, and concurrently displaying the content on the display device using the adjusted current zoom factor.

9. A system configured to determine a zoom factor of content displayed on a display device, comprising:
   at least one processor;
   memory; and
   at least one program stored in the memory and executable by the at least one processor, the at least one program comprising instructions to:
      obtain an image from a camera oriented toward a viewing position of the display device, the image including a viewer of the display device;
      after obtaining the image, normalizing the image automatically and without user intervention based on a specification of the camera to produce a normalized image, wherein the instructions to normalize the image based on the specification of the camera include instructions to scale the image based at least in part on one or more specifications of the lens of the camera and one or more specifications of the image sensor of the camera;

analyze the normalized image to determine a distance between the display device and the viewer of the display device;

determine a zoom factor for content based on the distance between the display device and the viewer of the display device; and display content on the display device using the zoom factor.

10. The system of claim 9, wherein the instructions to analyze the normalized image to determine the distance between the display device and the viewer of the display device include instructions to:

determine at least one metric for at least one physical feature of the viewer; and use the at least one metric for the at least one physical feature of the viewer to determine the distance between the display device and the viewer of the display device.

11. The system of claim 10, wherein the at least one metric for the at least one physical feature of the viewer is an area of a face of the viewer, and wherein the instructions to determine the at least one metric for the at least one physical feature of the viewer include instructions to:

identify the face of the viewer in the image; and determine the area of the face of the viewer.

12. The system of claim 10, wherein the at least one metric for the at least one physical feature of the viewer is a distance between the eyes of the viewer, and wherein the instructions to determine the at least one metric for the at least one physical feature of the viewer include instructions to:

identify the eyes of the viewer in the image; and determine the distance between the eyes of the viewer.

13. The system of claim 9, wherein the instructions to determine the zoom factor for the content based on the distance between the display device and the viewer of the display device include instructions to:

obtain one or more properties of the content;

obtain one or more specifications of the display device; and determine the zoom factor for the content based on the one or more properties of the content, the one or more specifications of the display device, and the distance between the display device and the viewer of the display device.

14. The system of claim 9, wherein the instructions to determine the zoom factor for the content based on the distance between the display device and the viewer of the display device include instructions to:

obtain one or more properties of the content;

obtain one or more specifications of the display device;

obtain at least one of an identity of the viewer and a value representative of the visual acuity of the viewer; and determine the zoom factor for the content based on the one or more properties of the content, the one or more specifications of the display device, the distance between the display device and the viewer of the display device, and at least one of the identity of the viewer and the value representative of the visual acuity of the viewer.

15. The system of claim 9, wherein the instructions to display the content on the display device using the zoom factor include instructions to display a subset of the content on the display device using the zoom factor.

16. The system of claim 9, wherein the instructions to display the content on the display device using the zoom factor include instructions to incrementally adjust a current zoom factor for the content until the zoom factor is reached, and concurrently display the content on the display device using the adjusted current zoom factor.

17. A non-transitory computer readable storage medium storing at least one program configured for execution by at least one processor of a computer system, the at least one program comprises instructions that when executed cause the at least one processor to:

obtain an image from a camera oriented toward a viewing position of the display device, the image including a viewer of the display device;

after obtaining the image, normalizing the image automatically and without user intervention based on a specification of the camera to produce a normalized image, wherein the instructions to normalize the image based on the specification of the camera include instructions to scale the image based at least in part on one or more specifications of the lens of the camera and one or more specifications of the image sensor of the camera analyze the normalized image to determine a distance between the display device and the viewer of the display device;

determine a zoom factor for content based on the distance between the display device and the viewer of the display device; and display content on the display device using the zoom factor.

18. The non-transitory computer readable storage medium of claim 17, wherein the instructions to analyze the normalized image to determine the distance between the display device and the viewer of the display device include instructions that when executed cause the at least one processor to:

determine at least one metric for at least one physical feature of the viewer; and use the at least one metric for the at least one physical feature of the viewer to determine the distance between the display device and the viewer of the display device.

19. The non-transitory computer readable storage medium of claim 18, wherein the at least one metric for the at least one physical feature of the viewer is an area of a face of the viewer, and wherein the instructions to determine the at least one metric for the at least one physical feature of the viewer include instructions to:

identify the face of the viewer in the image; and determine the area of the face of the viewer.

20. The non-transitory computer readable storage medium of claim 18, wherein the at least one metric for the at least one physical feature of the viewer is a distance between the eyes of the viewer, and wherein the instructions to determine the at least one metric for the at least one physical feature of the viewer include instructions to:

identify the eyes of the viewer in the image; and determine the distance between the eyes of the viewer.

21. The non-transitory computer readable storage medium of claim 17, wherein the instructions to determine the zoom factor for the content based on the distance between the display device and the viewer of the display device include instructions to:

obtain one or more properties of the content;

obtain one or more specifications of the display device; and determine the zoom factor for the content based on the one or more properties of the content, the one or more specifications of the display device, and the distance between the display device and the viewer of the display device.

22. The non-transitory computer readable storage medium of claim 17, wherein the instructions to determining the zoom factor for the content based on the distance between the display device and the viewer of the display device include instructions to:

obtain one or more properties of the content;

obtain one or more specifications of the display device;

obtain at least one of an identity of the viewer and a value representative of the visual acuity of the viewer; and determine the zoom factor for the content based on the one or more properties of the content, the one or more specifications of the display device, the distance between the display device and the viewer of the display device, and at least one of the identity of the viewer and the value representative of the visual acuity of the viewer.

23. The non-transitory computer readable storage medium of claim 17, wherein the instructions to display the content on the display device using the zoom factor include instructions to display a subset of the content on the display device using the zoom factor.

24. The non-transitory computer readable storage medium of claim 17, wherein the instructions to display the content on the display device using the zoom factor include instructions to incrementally adjust a current zoom factor for the content until the zoom factor is reached, and concurrently display the content on the display device using the adjusted current zoom factor.

25. A system configured to determine a zoom factor of content displayed on a display device, comprising:

means for obtaining an image from a camera oriented toward a viewing position of the display device, the image including a viewer of the display device;

means for normalizing the image automatically and without user intervention based on a specification of the camera to produce a normalized image, wherein the means for normalizing the image based on the specification of the camera includes means for scaling the image based at least in part on one or more specifications of the lens of the camera and one or more specifications of the image sensor of the camera;

means for analyzing the normalized image to determine a distance between the display device and the viewer of the display device;

means for determining a zoom factor for content based on the distance between the display device and the viewer of the display device; and means for displaying content on the display device using the zoom factor.

* * * * *